Oct. 26, 1943.    A. V. D. WILLGOOS    2,332,959
SLEEVE VALVE DRIVE
Filed Nov. 15, 1940    2 Sheets-Sheet 1
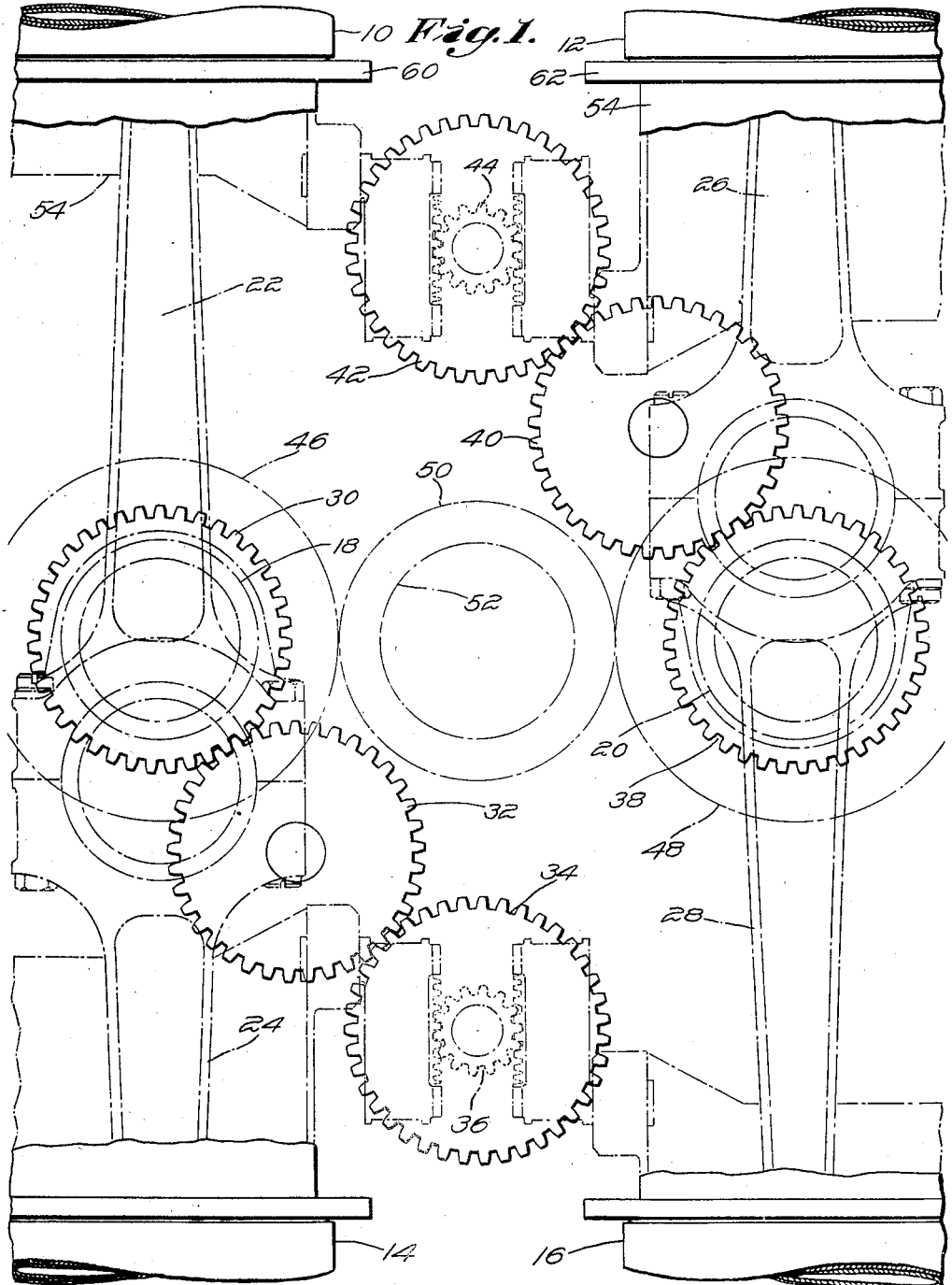

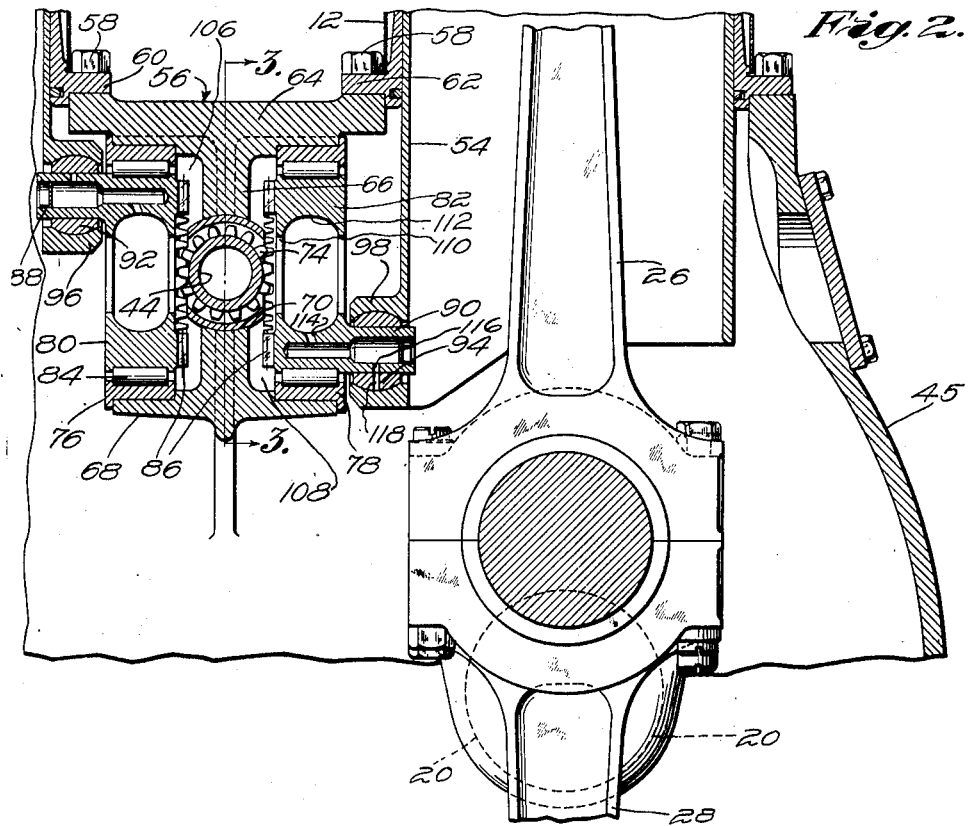
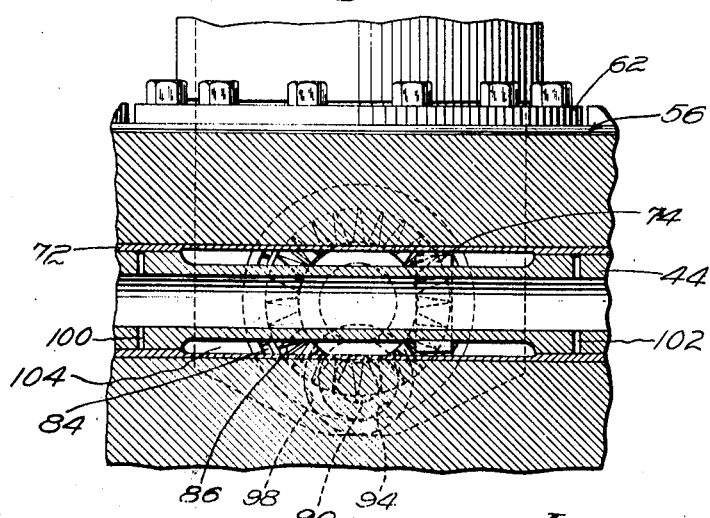

Patented Oct. 26, 1943

2,332,959

UNITED STATES PATENT OFFICE 2,332,959

SLEEVE VALVE DRIVE

Andrew V. D. Willgoos, West Hartford, Conn., assignor to United Aircraft Corporation, East Hartford, Conn., a corporation of Delaware Application November 15, 1940, Serial No. 365,771

3 Claims. (Cl. 123—81)

This invention relates to improvements in valve gears and has particular reference to an improved drive for engine valve sleeves.

An object of the invention resides in the provision of an extremely compact valve sleeve driving gear which can be located in the restricted space between two banks of engine cylinders.

A further object resides in the provision of a simplified valve gear requiring but one drive shaft for two banks or rows of engine cylinders.

A still further object resides in the provision of an improved valve gear of the character indicated, which can be adequately lubricated with a relatively small quantity of lubricant and without unduly decreasing the lubricating oil pressure.

An additional object resides in the provision of an improved valve gear of the character indicated which, while extremely compact and simple, is ruggedly constructed and rigidly assembled to relatively fixed parts of the engine so that there is little tendency for the various parts to get out of adjustment with each other.

Other objects and advantages will be more particularly pointed out hereinafter or will become apparent as the description proceeds.

In the accompanying drawings, in which like reference numerals are used to designate similar parts throughout, there is illustrated a suitable mechanical embodiment for the purpose of disclosing the invention. The drawings, however, are for the purpose of illustration only and are not to be taken as limiting or restricting the invention since it will be apparent to those skilled in the art that various changes in the illustrated construction may be resorted to without in any way exceeding the scope of the invention.

In the drawings,

Fig. 1 is a schematic elevational view of one end of an engine and shows a portion of the drive for the valve gear, Fig. 2 is a transverse sectional view through a fragmentary portion of an engine and particularly illustrates the location and construction of the improved valve gear, and Fig. 3 is a sectional view on the line 3—3 of Fig. 2.

Referring to the drawings in detail, and particularly to Fig. 1, the engine illustrated has four banks of cylinders, as indicated by the individual cylinders 10, 12, 14 and 16, and has two crankshafts, as indicated at 18 and 20, being of the type generally known to the art as an H engine. The two cylinder rows 14 and 16 are inverted, the row 14 being opposite the row 10 and the row 16 being opposite the row 12. The crankshaft 18 is disposed between the rows 10 and 14 and the pistons operating within the cylinders of these rows are connected to the crankshaft 18 by individual connecting rods, as indicated at 22 and 24, and the pistons of the rows 12 and 16 are similarly connected to the crankshaft 20, disposed between these rows, by connecting rods, as indicated at 26 and 28. Each individual connecting rod has a bearing connection with the respective crankshaft, any desired or conventional bearing arrangement being used. For instance, one of the rods may have a bifurcated end portion carrying the crank bearing and the associated rod may have an end portion which fits between the two parts of the bifurcated end portion and carries a bearing surrounding the same crank pin.

A spur gear 30 is secured on the crankshaft 18 and meshes with an idler gear 32 which in turn meshes with a gear 34 secured on the end of a shaft 36 which extends longitudinally between the cylinder rows 14 and 16 within the engine crankcase. The crankshaft 20 carries a gear 38, similar to the gear 30, which meshes with an idler gear 40 which in turn meshes with a gear 42 on the end of a shaft 44 which extends longitudinally of the engine between the cylinder rows 10 and 12. These two gear trains of three gears each provide means for driving the valve gear shafts 36 and 44 from the engine crankshaft at a definite predetermined speed ratio. The two crankshafts are positively interconnected by suitable means such as the respective spur gears schematically indicated at 46 and 48 which mesh with a center gear 50 mounted on a centrally located power shaft or drive shaft 52 which receives the power from the crankshafts 18 and 20 and transmits it to any device driven by the engine.

Each engine cylinder is provided with a valve sleeve, as indicated at 54, which is slidable and rotatable in the cylinder between the cylinder and the piston and has valve ports therein which cooperate with valve ports in the cylinder in the conventional manner, the portions of the cylinder and sleeve containing the ports being omitted from the drawings since a detailed description thereof does not appear to be necessary for the present disclosure.

A valve gear support, generally indicated at 56 and constituting a portion of the crankcase 45, is disposed between each respective pair of adjacent cylinder rows and may be secured to the cylinders or cylinder blocks by suitable means such as the bolts 58 which pass through suitable flange portions 60 and 62 on the individual cylinders or on the respective cylinder blocks and through the edge portions of a flange portion 64 of the member 56. A web portion 66 of this support 56 extends from the center portion of the flange 64 to the center portion of an inner flange 68 giving the support member 56 a generally I shape cross section. The web portion 66 is apertured, as indicated at 70, for the shaft 44 and suitable bearings, as indicated at 72, are incorporated for supporting the shaft in the support member for rotation therein. The shaft is provided with spaced gear elements, one of which is indicated at 74, rigidly secured thereto or formed integrally therewith, there being one such gear element for each two adjacent cylinders in the two cylinder rows with which the particular shaft cooperates. Between the outer edge portion of the flanges 64 and 68 are secured a plurality of outer race members, two of which are indicated at 76 and 78, within which there are disposed respective gear elements, as indicated at 80 and 82, rotatably mounted in the respective race elements by suitable anti-friction means such as the rollers 84. Each of these gear elements is provided on the inner face thereof with a series of gear teeth, as indicated at 86 of the type referred to in the art as "Fellows face gears." The gear 74 is a simple spur gear with straight teeth while the gears 80 and 82 have teeth the outer ends of which are parallel to the face of the gear but the sides of which are cut at angles to maintain full contact with the teeth of the gear 74 as the drive and driven gears rotate together. The use of this "Fellows face" type gearing avoids the necessity of using beveled gears for driving the valve sleeves and thus renders the gear drive much more compact and saves valuable space between the two cylinder rows. This feature is of particular importance in aircraft engines when it is desired to reduce the frontal area by placing the parallel cylinder banks as close together as possible.

Each of the gears indicated at 80 and 82 is provided with a crank, as indicated at 88 and 90, respectively, and each of these cranks carries a ball joint member, as indicated at 92 and 94, respectively, received in respective sockets, as indicated at 96 and 98, provided on the ends of the associated cylinder valve sleeves.

As the gears 30 and 38 are rotated by the respective crankshafts 18 and 20 the respective gears 34 and 42 will be rotated driving the valve gear shafts 36 and 44. Each valve gear shaft will drive its associated driven gears, such as 80 and 82, and these gears will in turn move the respective valve sleeve sockets in a circular orbit thereby imparting to the valve sleeve a combined rotational and longitudinal movement which will effectively open and close the valve ports provided in the sleeves and the associated cylinders.

Each of the valve shafts has a continuous axial bore therethrough, plugged at the ends by some suitable means, not illustrated, and lubricating oil under pressure from the engine lubricating system is fed into the hollow interior of each valve shaft. The lubricant leaves the interior of the shafts through suitable apertures, as indicated at 100 and 102 in Fig. 3, disposed within the respective shaft bearings 72 and, after lubricating the bearings 72, flows into the spaces, as indicated at 104, surrounding each shaft between adjacent bearings 72. From the shaft surrounding spaces 104 the lubricant flows into the spaces, as indicated at 106 and 108 in Fig. 2, at the inner side of each face gear such as are indicated at 80 and 82. From each of the last mentioned spaces some of the lubricant flows through the respective gear surrounding bearing 84 to lubricate the same and from the bearing to the engine oil return or sump. The remainder of the lubricant fills up the space until it overflows through the central gear aperture 110 and runs into the annular cavity 112 provided interiorly of each gear. From the cavity 112 a sufficient amount of lubricant will flow through one or more suitable apertures, as indicated at 114 to the hollow interior of the pin 90 and from the interior of the pin through suitable apertures 116 and 118 to the bearing surfaces of the ball joint 94. From the ball joint the lubricant will flow to the sump or engine oil return and any lubricant overflowing the cavity 112 will flow into the interior of the engine through the end of the aperture 110 opposite the end through which the lubricant enters. Centrifugal force imposed on the lubricant in the cavity 112 by rotation of the gear will provide sufficient outward pressure to insure an adequate supply of lubricant to the ball joint at all times. Both ends of the hollow pin 90 are closed to force the lubricant in the pin to flow out through the aperture 114.

This arrangement provides a lubrication method that requires only a small flow of lubricant for each valve gear unit, the same lubricant being used over again to lubricate each successive set of bearing surfaces in the direction of lubricant flow. The loss of engine lubricant to the valve gear is, therefore, substantially only that amount required to lubricate the valve shaft bearings.

While a particular mechanical arrangement has been hereinabove described and illustrated in the accompanying drawings for the purpose of disclosing the invention, it is to be understood that the invention is not limited to the particular arrangement so illustrated and described, but that such changes in the size, shape and arrangements of the various parts may be resorted to as come within the scope of the subjoined claims.

Having now described the invention so that others skilled in the art may clearly understand the same, what it is desired to secure by Letters Patent is as follows:

1. In an internal combustion engine having a crankshaft, two parallel rows of cylinders on the same side of said crankshaft, and a valve sleeve in each cylinder; a valve gear supporting member between said cylinder rows and attached to said cylinders, a valve shaft supported by said member for rotation by said crankshaft, said valve shaft extending between and parallel to said rows of cylinders, spur gears on said valve shaft, one between each two corresponding cylinders of the respective cylinder rows, bearings on said supporting member on opposite sides of each said spur gear, face gears rotatably mounted on said bearings for rotation about an axis normal to said valve shaft axis, said face gears being located one between each cylinder and a respective spur gear, and each having teeth meshing with the teeth of said respective spur gear, and means drivingly connecting each said face gear and a respective valve sleeve.

2. An engine valve sleeve operating mechanism comprising, a hollow engine driven valve shaft, a bearing for supporting said shaft, means for supplying lubricant to the interior of said shaft, at least one lubricant passage through said shaft for supplying lubricant to said bearing, a gear on said shaft adjacent to said bearing, a fixed bearing member adjacent to said gear, a face gear rotatably mounted in said bearing member and meshing with said shaft gear and having a central aperture therethrough and an annular cavity surrounding said aperture, means for collecting the lubricant leaving said bearing and directing the same to the adjacent surfaces of said face gear and said fixed bearing member and to the cavity in said face gear, a hollow pin and a ball joint connecting said face gear with an engine sleeve, and oil passages for conducting lubricant from said cavity to the interior of said pin and from said pin to said ball joint.

3. In an internal combustion engine, a valve sleeve operating mechanism comprising, a fixed valve gear support having a central web and spaced apart flanges extending outwardly from opposite sides of said web, a valve shaft rotatably supported by said web, a spur gear on said valve shaft, bearings supported between said flanges one on each side of said web, and a face gear mounted in each of said bearings for rotation about an axis normal to the axis of rotation of said spur gear and having teeth meshing with the teeth of said spur gear, said face gears each having means thereon for operating a valve sleeve.

ANDREW V. D. WILLGOOS.